United States Patent [19]

Niki

[11] 3,873,978

[45] Mar. 25, 1975

[54] KEYBOARD CIRCUIT

[75] Inventor: Shuji Niki, Furukawa, Japan

[73] Assignee: Alps Electric Co., Ltd., Tokyo, Japan

[22] Filed: Feb. 14, 1974

[21] Appl. No.: 442,312

[30] Foreign Application Priority Data

Mar. 16, 1973 Japan .............................. 48-30684

[52] U.S. Cl. .............................. 340/365 R, 307/244

[51] Int. Cl. .............................. H04l 15/06

[58] Field of Search .............................. 340/365 R

[56] References Cited

UNITED STATES PATENTS

| | | | |
|---|---|---|---|
| 2,276,646 | 3/1942 | Boswau | 340/365 R |
| 2,521,353 | 9/1950 | Fitch | 340/365 R |
| 2,794,976 | 6/1957 | Faulkner | 340/365 R |
| 3,166,636 | 1/1965 | Rutland | 340/365 R |
| 3,221,304 | 11/1965 | Ehikeleff | 340/365 R |
| 3,493,922 | 2/1970 | Laas | 340/365 R |
| 3,787,732 | 1/1974 | Larson | 340/365 R |

*Primary Examiner*—Thomas B. Habecker

[57] ABSTRACT

The keyboard circuit includes a row and column matrix of electrically isolated conductors having a key switch at each intersection which is effective, when closed, to electrically couple the intersecting row and column conductors associated therewith. Each of the row conductors is connected to the input of a different one of a plurality of first switching circuits. Likewise, each of the column conductors is connected to the input of a different one of a plurality of second switching circuits. Each of the first switching circuits is designed to generate an output of a given logic level only in the presence of a bias voltage of a given magnitude. Each of the second switching circuits is designed to generate an output at the given voltage level only in the absence of the bias voltage. Each of the row conductors is connected to a voltage source which normally provides sufficient bias to cause the respective first switching circuit to generate an output at the given logic level. The column conductors are normally not connected to a voltage source such that the respective second switching circuits also generate outputs at the given logic level. When a key switch is depressed, the row conductor and column conductor associated therewith are electrically coupled thus causing the bias voltage to be diverted from the first switching circuit connected to the row conductor to the second switching circuit connected to the column conductor thus causing both switching circuits to generate outputs at a second logic level. The second logic level output signals from each of the switching devices may then be utilized as encoding signals which form the input for an encoder circuit.

14 Claims, 4 Drawing Figures

PRIOR ART

KEYBOARD CIRCUIT

The present invention relates to keyboard circuits for producing encoding signals in a keyboard device and more particularly to a novel keyboard circuit wherein the column and row switching circuits are electrically coupled by the depression of the key switch to change the logic level outputs therefrom.

A conventional keyboard circuit utilized to produce encoding signals in a keyboard device typically has a plurality of depressible keys arranged in a row and column matrix. The circuit includes a row and column matrix of electrical conductors. One of the depressible key switches is associated with each intersection in the conductor matrix. Each of the conductors is electrically isolated from each of the other conductors and from ground and is operably connected to a different one of a plurality of switching circuits. Each conductor is separately connected to a voltage source which normally biases the associated switching circuit to generate an output at a given logic level. When a key switch is depressed, the row and column conductor at the intersection associated with the key switch are each individually grounded thus causing the voltage on the conductor to fall below the bias voltage of the associated switching circuit. The switching circuits are designed to generate an output at a second logic level when the bias voltage is removed. Thus, the switching circuits connected to the row and column conductors which have been grounded change their logic outputs, thus supplying encoding signals for an appropriate encoder circuit.

The particular prior art configuration described above necessitates the use of dual path switches as key switches at each intersection of the conductor matrix such that each of the conductors associated with that switch can be separately grounded when the switch is depressed. Thus, it is necessary that the same depressible switch actuator simultaneously closes two independent sets of switch contacts, one set which grounds the row conductor and the other set which grounds the column conductor associated with that key switch. The use of switches of this type is disadvantageous because it adds to the cost and complexity of the device while substantially enhancing the possibilities of mechanical failure.

A second prior art design has been utilized to alleviate these disadvantages. In this configuration, the switch is connected to each of the conductors at the associated intersection by means of a diode. One terminal of the switch is connected to ground and the other terminal is connected to the junction point between the cathodes of the two diodes. The anode of each diode is connected to a different one of the conductors in the intersection. When a key switch is depressed, the conductors of the intersection associated with the key switch are separately coupled to ground through the respective diodes, thus driving the switching circuits associated with each of the grounded conductors to supply encoding signals to the encoder circuit. This configuration, while eliminating some of the disadvantages of the dual contact switch configuration, has its own disadvantages because two diodes are required for each key switch, thus increasing the cost and complexity of the circuit. Further, if the keyboard circuit is comprised of TTL switching circuits, the output logic voltage of these TTL switching circuits may be adversely affected by the voltage drop caused by the forward resistance of the diode.

It is, therefore, a prime object of the present invention to provide a keyboard circuit which does not require dual contact switches or diodes in conjunction with the key switches in order to provide the appropriate encoding signals.

It is another object of the present invention to provide a keyboard circuit wherein the switching circuits are designed such that when electrically coupled together they generate the appropriate encoding signals.

It is a further object of the present invention to provide a keyboard circuit wherein the conductors need not be individually grounded to cause the associated switching circuits to produce the appropriate encoding signals.

In accordance with the present invention a plurality of electrical conductors are arranged in a row and column matrix having a depressible key switch associated with each column thereof. The conductors are normally electrically isolated but the depression of a key switch causes the conductors at the associated intersection to be electrically coupled. Each of the row conductors is connected to the input of a different one of a plurality of first switching circuits. In a similar manner, each of the column conductors is connected to the input of a different one of a plurality of second switching circuits.

Each of the row conductors is operatively connected to a voltage source. The first switching circuits are designed to produce an output at a given logic level in the presence of the appropriate bias voltage. Thus, when the row conductor is electrically isolated, the voltage source provides the appropriate bias voltage to the first switching device such that it generates an output at the given logic level. However, when the biasing voltage drops below a given level, the first switching circuit is designed to generate an output at a second logic level.

The second switching devices are designed to generate an output at the given logic level in the absence of a biasing voltage. When the appropriate biasing voltage is applied thereto, the second switching circuit is designed to generate at an output at the second logic level.

When a key switch is depressed, the row and column conductors at the intersection associated with the key switch are electrically coupled. Because the voltage level necessary to bias the first switching circuit is considerably greater than the voltage level necessary to bias the second switching circuit, and because the original voltage is insufficient to bias both circuits simultaneously, the voltage originally applied only to the first switching circuit is diverted to the second switching device, thus causing both switching circuits to generate second logic level outputs. Therefore, coupling the conductors causes the respective switching circuits to change their output logic levels thus supplying the appropriate encoding signals to the encoder circuit.

To the accomplishment of the above, and to such other objects as may hereinafter appear, the present invention relates to a keyboard circuit as defined in the appended claims and as described in the specification, taken together with the accompanying drawings, wherein like numerals refer to like parts and in which:

FIG. 1. is a schematic diagram of a prior art dual contact switch keyboard circuit;

Figure 1:
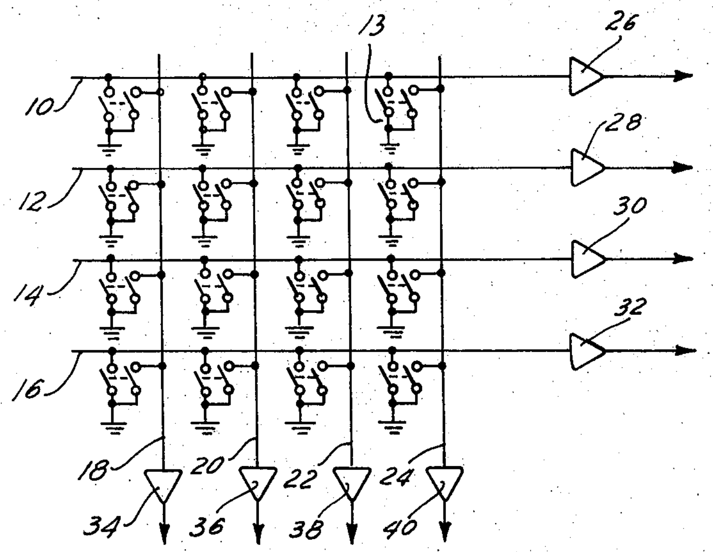
FIG. 1 PRIOR ART

FIG. 1 is a schematic diagram of the dual contact switch prior art keyboard circuit. This circuit includes four row conductors 10, 12, 14 and 16 which are electrically isolated from four column conductors 18, 20, 22, 24. Each of the row conductors 10, 12, 14, 16 is connected to a different one of the switching circuits 26, 28, 30 and 32 respectively. In a similar manner each of the column conductors 18, 20, 22, 24 is connected to a different one of the switching circuits 34, 36, 38 and 40 respectively. At the intersection of each row conductor and column conductor, a dual contact switch 13 is provided such that each of the conductors of the intersection can be separately but simultaneously grounded as the switch is depressed. Each of the switching circuits 26, 28, 30, 32 and 34, 36, 38 and 40 are designed such that they normally generate an output at a given logic level but when the input thereof is grounded the output changes to a second logic level. Thus, encoding signals are obtained from this type of configuration by depressing the appropriate key switch which serves to simultaneously and separately ground the conductors at the intersection associated with that key switch. The grounding of the conductors causes the appropriate switching circuits to change their output logic level thereby supplying the appropriate coding signals to an encoder circuit (not shown). As mentioned above, this configuration has the disadvantage of requiring dual contact switches at each intersection thus contributing to the cost and complexity of the circuit and reducing the mechanical reliability thereof.

Figure 2:
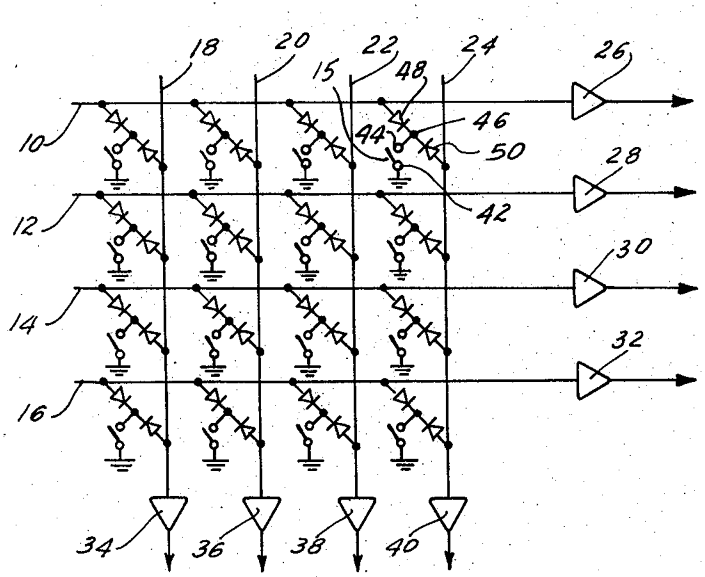
FIG. 2 PRIOR ART
FIG. 2 is a schematic circuit of a prior art keyboard circuit utilizing diodes.

FIG. 2 shows the diode type prior art keyboard circuit. This circuit also has row conductors 10, 12, 14 and 16 which are connected to the inputs of switching devices 26, 28, 30 and 32 respectively. Column conductors 18, 20, 22 and 24 are connected to the inputs of switching circuits 34, 36, 38 and 40 respectively. However, each of the keyboard switches, 15, comprises a first terminal 42 which is connected to ground and a second terminal 44 which is connected to the junction node 46 of a pair of diodes 48 and 50. The cathodes of diodes 48 and 50 are both connected to node 46. The anode of diode 48 is connected to the row conductor and the anode of diode 50 is connected to the column conductor. Thus, the diodes serve to electrically isolate the conductors from each other but still permit the use of a single path switch to ground each of the conductors simultaneously. This circuit, as mentioned above, has the disadvantage of requiring a large number of diodes which, when the switching circuits are TTL switching circuits, may adversely affect the output logic levels because of the forward resistance thereof.

Figure 3:
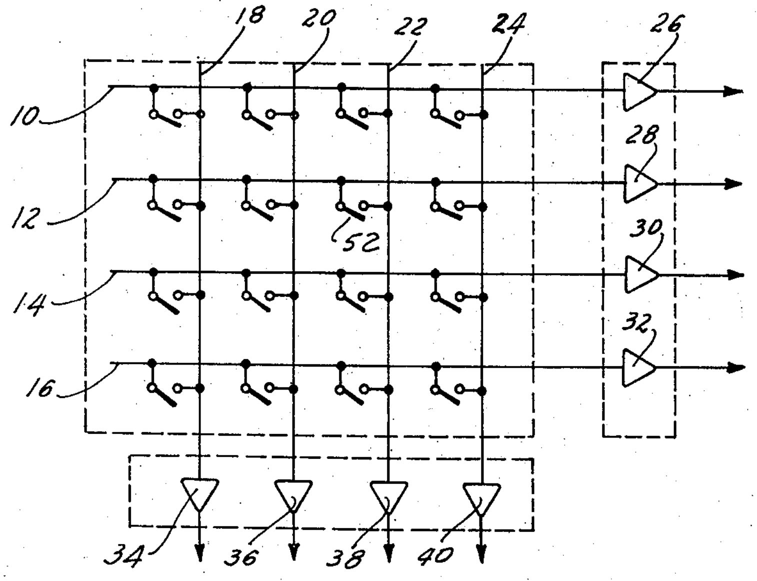
FIG. 3 is a schematic diagram of a preferred form of the present invention.
Figure 4:
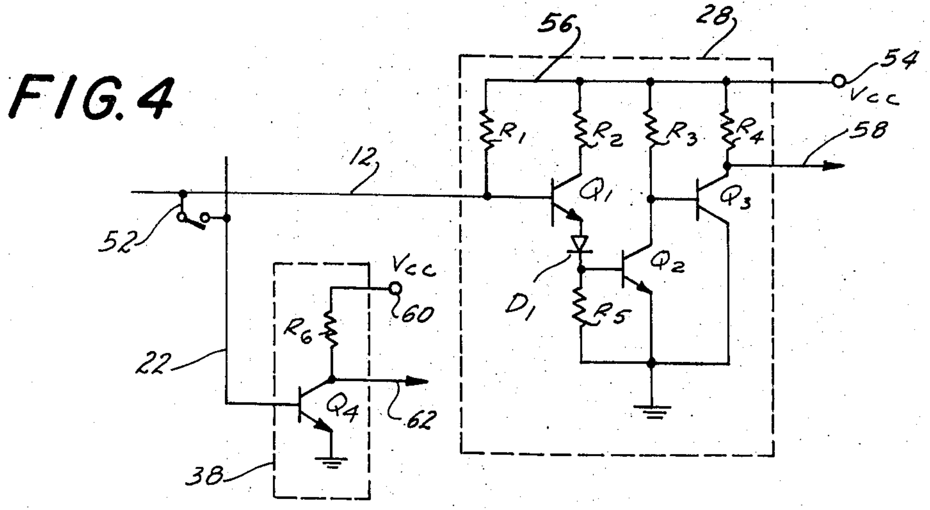
FIG. 4 is a schematic diagram of the switching circuits of a preferred form of the present invention.

FIGS. 3 and 4 show a preferred embodiment of the present invention. As seen in FIG. 3, a plurality of conductors are arranged in a row and column matrix which are electrically isolated from each other as in the prior art configurations. Again, the row conductors are labeled 10, 12, 14, 16 and the column conductors are labeled 18, 20, 22 and 24. Row conductors 10, 12, 14 and 16 are connected to first switching circuits 26, 28, 30 and 32 respectively. Column conductors 18, 20, 22, 24 are connected to second switching circuits 34, 36, 38 and 40 respectively. At the intersection of each row and column conductor, a key switch 52 is provided, each pole of which is connected to a different one of the conductors at the intersection. Normally these switches are in the open position. However, when the key switch is depressed, the switch is effective to electrically couple the conductors at the intersection. The effect of the electrical coupling of the conductors on the associated switching circuits can be appreciated from an examination of FIG. 4.

FIG. 4 shows a typical first switching device, generally designated 28 and a typical second switching device, generally designated 38. The input of switching device 28 is connected to row conductor 12 and the input of second switching device 38 is connected to column conductor 22. Row conductor 12 and column conductor 22 are normally electrically insulated from each other but when a switch 52 at the intersection thereof is depressed, the conductors are electrically coupled.

Each of the first switching circuits, of which circuit 28 is an example, comprises three transistors $Q_1$, $Q_2$, $Q_3$, each of which has a control terminal and an output circuit. A node 54 connects a line 56 to a voltage source $V_{CC}$. The output of the circuit, a node 58, is connected to line 56 through a resistor $R_4$. The output circuit of transistor $Q_3$ is connected betwen ground and output node 58. A resistor $R_3$ is connected to line 56 and the output circuit of transistor $Q_2$ conditionally connects resistor $R_3$ to ground. The control terminal of transistor $Q_3$ is connected to the junction between resistor $R_3$ and the output circuit of transistor $Q_2$. A resistor $R_2$ is connected between the output circuit of transistor $Q_1$ and line 56. A diode $D_1$ and a resistor $R_5$ are connected in series between the output circuit of transistor $Q_1$ and ground. The control terminal of transistor $Q_2$ is connected to the junction between diode $D_1$ and resistor $R_5$. Conductor 12 is connected to the control terminal of transistor $Q_1$ and in addition to line 56 through a resistor $R_1$.

When switch 52 is opened, voltage from source $V_{CC}$ is applied through resistor $R_1$ to the control terminal of transistor $Q_1$. This voltage is sufficient to bias transistor $Q_1$ into conductivity. Current then flows from line 56 through resistor $R_2$, the output circuit of transistor $Q_1$ and diode $D_1$ to the base of transistor $Q_2$. Transistor $Q_2$ is, therefore, placed in the conductive state when switch 52 is opened so that the control terminal of transistor $Q_3$ is connected to ground. Thus, transistor $Q_3$ is nonconductive. Output node 58 is therefore connected to line 56 through resistor $R_4$ and thus generates an output representative of a given logic state.

From this brief description of the first switching circuit, it will be appreciated that in order to render transistor $Q_2$ conductive (thereby rendering transistor $Q_3$ nonconductive such that the given logic level output appears at node 58), the voltage $V_{cc}$ applied to the first switching circuit must be sufficient to bias transistors $Q_1$ and $Q_2$ into conductivity as well as to overcome the forward resistance of diode $D_1$. For simplicity, this voltage is designated herein as $BV_f$. $V_{cc}$ is greatere than $BV_f$ and therefore when switch 52 is opened, a first switching circuit is biased to produce the given logic level output.

Each of the second switching circuits, of which circuit 38 is an example, consists of a single transistor $Q_4$ and a resistor $R_6$. A node 60 is connected to a voltage source $V_{cc}$. Resistor $R_6$ and the output circuit of transistor $Q_4$ are connected in series between node 60 and ground. The output node 62 of the circuit is connected to the junction between the output circuit of transistor $Q_4$ and resistor $R_6$. The control terminal of transistor $Q_4$ is connected to conductor 22. When switch 52 is opened, no voltage is present on conductor 22 and thus transistor $Q_4$ is nonconductive. Node 60 is connected to output node 62 through resistor $R_6$ and, as long as transistor $Q_4$ remainds nonconductive, the output voltage will be at the given logic level.

It will be appreciated, that in order to render transistor $Q_4$ conductive, and thus cause the output of the second switching circuit to be at the second logic level, the threshold voltage of transistor $Q_4$, designated herein as $BV_{II}$, must be exceeded. When switch 52 is opened, no voltage is present on conductor 22 and thus $BV_{II}$ is not exceeded.

Voltage $V_{cc}$ is less than $BV_I + BV_{II}$. Therefore, when switch 52 is closed and $V_{cc}$ is connected to the input of both switching circuits, this voltage is not high enough to bias the first switching circuit to generate the given logic level output and simultaneously bias the second switching circuit to generate a second logic level output. If all the transistors are silicon transistors and the diode is a silicon diode, the threshold voltages of the transistors may be made approximately equal to each other and to the voltage drop across diode $D_1$. Since $BV_I$ may be considered equal to the sum of the threshold voltage of transistor $Q_1$ plus the voltage drop across diode $D_1$ plus the threshold voltage of transistor $Q_2$, this value is approximately three times the value of $BV_{II}$ which in turn is equal to the threshold voltage of transistor $Q_4$.

When switch 52 is closed, a portion of $V_{cc}$ will render transistor $Q_4$ conductive ($V_{cc}$ is greater than $BV_{II}$) thereby causing the second switching circuit to generate the second logic level output. However, the remaining voltage ($V_{cc}$ minus $BV_{II}$) is less than $BV_I$ and therefore the first switching circuit will also generate the second logic level output. Thus, as long as $V_{cc}$ is less than $BV_I$ plus $BV_{II}$, and $V_{cc}$ minus $BV_{II}$ is less than $BV_I$, when switch 52 is closed both the first and the second switching circuits will generate the second logic level. However, when switch 52 is opened, both the first and second switching circuits will generate the given logic level.

In other words, because $V_{cc}$ minus $BV_{II}$ is less than $BV_I$, a portion of the voltage normally biasing circuit 28 to produce the given logic level input is diverted to circuit 38 through conductor 12, switch 52 and conductor 22. Transistors $Q_1$ and $Q_2$ are rendered nonconductive such that current flows from line 56 to the control terminal of transistor $Q_3$ through resistor $R_4$ thus turning transistor $Q_3$ on and connecting output node 58 with ground such that the output is at the second logic level. Simultaneously, the diverted voltage from source $V_{cc}$ renders transistor $Q_4$ conductive and the output circuit of transistor $Q_4$ connects node 62 with ground. Thus, the second switching device is also caused to generate output at the second logic level. Therefore, the closing of switch 52 causes each of the switching circuits connected to the conductors at the intersection with which the switch is associated to change their respective output logic levels to the second logic level.

Although a buffer circuit alone is shown in the above example for use in the switching circuit, it is also possible to combine the buffer circuit with an inverter circuit which is constructed to invert the output of the buffer circuit, if desired. It may also be possible to use an electronic contact in place of a key switch contact. Further, although the example involves a matrix having four rows and four columns, it is obvious that the principle involved can be utilized in a conductor matrix having any desired number of rows and columns. Moreover, although the words "row" and "column" have been used to designate horizontal and vertical conductors respectively, it is obvious that these conductors may be interchanged and still obtain the same result.

The present invention provides a keyboard circuit which eliminates the necessity for double path switches or diodes as conventionally used in prior art circuits of this type. It, therefore, provides simplicity and reduced cost as well as enhancing the mechanical reliability of the circuit.

A single preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

I claim:

1. A keyboard circuit comprising a first conductor and a second conductor, switch means capable of electrically coupling said first conductor to said second conductor, first and second signal generating means operably connected to said first and second conductors, respectively, said first and said second signal generating means normally generating a signal of a given level and being effective, when electrically coupled through said switch means, to respectively generate signals of a second level.

2. The circuit of claim 1 wherein said first signal generating means comprises first and second voltage sources at different potentials, an output terminal normally operably connected to said first source and means for operably connecting said terminal to said second source when said first and said second conductors are coupled by said switch means.

3. The circuit of claim 2 wherein said connecting means comprises a first switching device having a control terminal and an output circuit, said output circuit operably connected between said output terminal and said second source and means for controlling said first switching device, said control means being effective to sense the state of said switch means and to control the conductivity of said first switching device in accordance therewith.

4. The circuit of claim 3 wherein said first source is operably connected to said first conductor and wherein said control means is operably connected to said first conductor and effective, when the voltage of said first conductor is reduced below a given level, to render said first switching device conductive.

5. The circuit of claim 3 wherein said control means comprises second and third switching devices each of which has a control terminal and an output circuit, the control terminal of said second device being operably connected to said first conductor and the output circuit thereof being connected between said first source and the control terminal of said third switching device, the output circuit of said third switching device being operably connected between the control terminal of said first switching device and said second source.

6. The circuit of claim 1 wherein said second signal generating means comprises a third and a fourth voltage source at different potentials, an output terminal operably connected to said third source and means for operably connecting said terminal with said fourth source when said first conductor is coupled to said second conductor.

7. The circuit of claim 6 wherein said connecting means comprises a switching device having a control terminal and an output circuit, said output circuit being operably connected between said terminal and said fourth source and said control terminal operably connected to said second conductor.

8. The circuit of claim 5 wherein said second signal generating means comprises a third and a fourth voltage source at different potentials, an output terminal operably connected to said third source and means for operably connecting said terminal with said fourth source when said first conductor is coupled to said second conductor.

9. The circuit of claim 8 wherein said connecting means comprises a switching device having a control terminal and an output circuit, said output circuit being operably connected between said terminal and said fourth source and said control terminal operably connected to said second conductor.

10. The keyboard circuit of claim 1 wherein said first signal generating means generates a signal of said given level in the presence of a first bias voltage and said signal generating means generates a signal of a second level in the presence of a second bias voltage.

11. The keyboard circuit of claim 10 wherein said first bias voltage is greater than said second bias voltage.

12. The keyboard circuit of claim 10 further comprising a voltage source operatively connected to said first conductor to generate a given voltage, said given voltage being greater than either of said first and second bias voltages but less than the sum thereof.

13. A keyboard circuit comprising a first conductor and a second conductor, first and second signal generating means operably connected to said first and second conductors, respectively, said first signal generating means generating a signal at a given level upon the application of a bias voltage thereto and said second signal generating means generating a signal at a second level upon application of a bias voltage thereto, means for applying bias voltage to said first conductor and switch means connected to said first and said second conductors for diverting said bias voltage from said first signal generating means to said second signal generating means.

14. A keyboard circuit comprising a first and a second conductor, switch means capable of electrically coupling said first conductor to said second conductor, first and second signal generating means operably connected to said first and second conductors, respectively, said first signal generating means adopted to generate a high output when energized by a voltage source and a low output when not so energized, and said second signal generating means adopted to generate a low output when energized by a voltage source and a high output when not so energized, a voltage source connected to said first conductor such that when said switch means does not couple said conductors only said first signal generating means is energized and said first and said second signal generating means generate high outputs and when said switch means couples said conductors said voltage source is connected to said first and said second signal generating means but only said second signal generating means is energized such that both signal generating means generate low outputs.

* * * * *